(No Model.)
J. S. YOUNG.
WHEEL.
No. 431,927. Patented July 8, 1890.
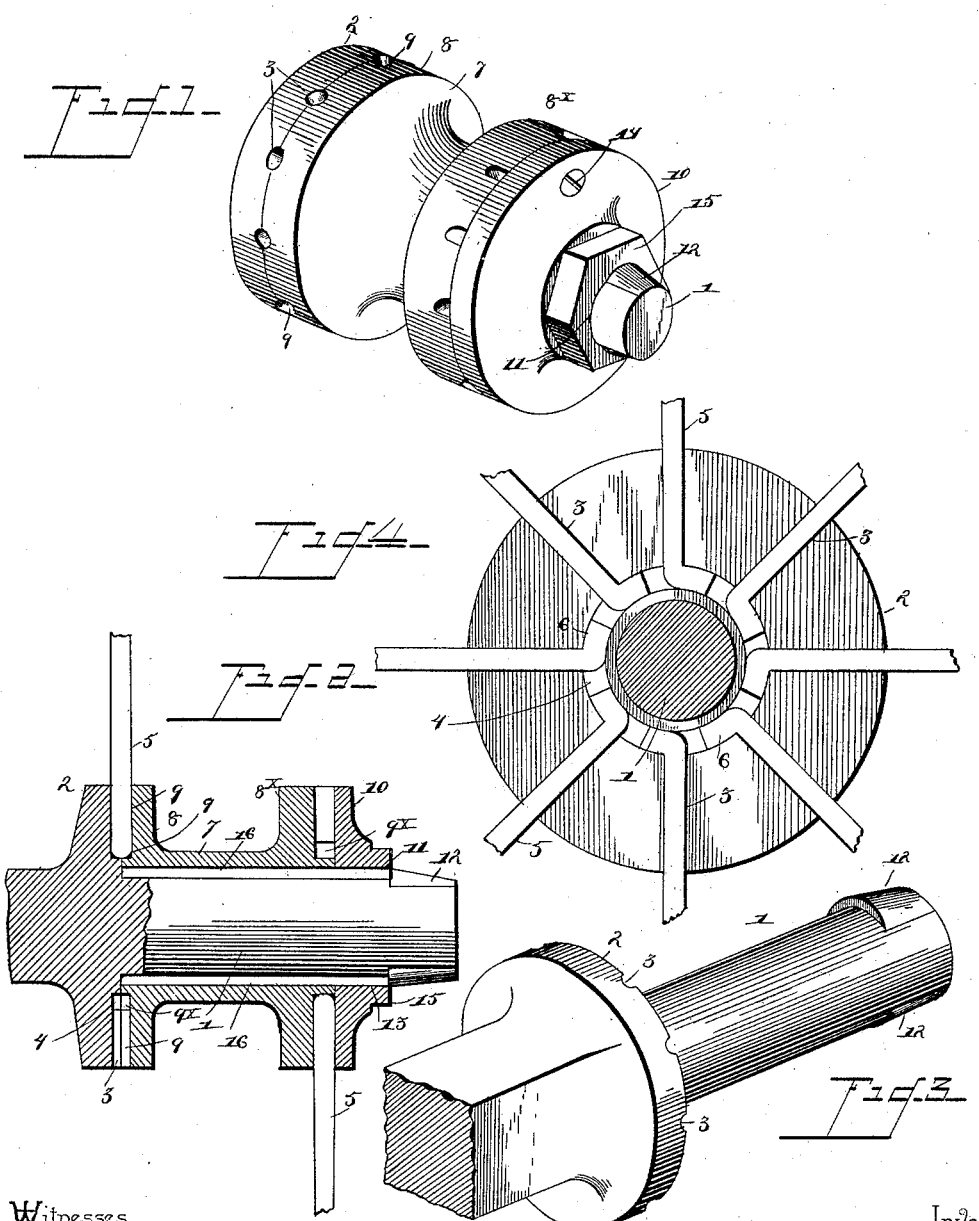
Witnesses
Geo. E. Fuch.
H. F. Riley
Inventor
John S. Young
By his Attorneys.
C. A. Snow & Co.

UNITED STATES PATENT OFFICE.

JOHN S. YOUNG, OF DEFIANCE, OHIO.

WHEEL.

SPECIFICATION forming part of Letters Patent No. 431,927, dated July 8, 1890.

Application filed May 7, 1890. Serial No. 350,924. (No model.)

*To all whom it may concern:*

Be it known that I, JOHN S. YOUNG, a citizen of the United States, residing at Defiance, in the county of Defiance and State of Ohio, have invented a new and useful Wheel, of which the following is a specification.

The invention relates to improvements in wheels.

The object of the present invention is to provide a simple and inexpensive wheel for agricultural implements capable of having its parts readily removed and replaced for the purpose of removing worn or broken spokes and inserting new ones or for otherwise repairing the parts.

The invention consists in the construction and novel combination and arrangement of parts, hereinafter fully described, illustrated in the accompanying drawings, and pointed out in the claims hereto appended.

In the drawings, Figure 1 is a perspective view of a hub constructed in accordance with this invention. Fig. 2 is a longitudinal sectional view. Fig. 3 is a detail perspective view of the axle-box and integral flange. Fig. 4 is an elevation of the same, showing spokes in the grooves.

Referring to the accompanying drawings, 1 designates an axle-box provided at one end with an integral flange 2, having in its inner face a series of semicircular radial grooves 3, terminating in an annular groove 4 and adapted to receive spokes 5, having laterally-bent inner ends 6 to fit in said annular groove 4 to prevent the spokes being withdrawn. The spokes are retained in the grooves of the integral flange 2 by a sleeve 7, arranged upon the axle-box and provided at its ends with flanges 8 $8^\times$, having similar radial grooves 9 and annular groove $9^\times$ in their outer faces, those in the flange 8 being adapted to register with the grooves of the flange 2 to form cylindrical spoke-sockets. The grooves of the other flange $8^\times$ are slightly larger and contain the entire lower end of the spokes. The wheel is provided with spokes that have their inner ends arranged alternately upon opposite ends of the hub, and those on the side opposite the integral flange 2 are secured in the grooves of the adjacent flange $8^\times$ of the sleeve by a collar 10, which is provided with a central opening 11, and is secured upon the axle-box by shouldered projections 12, preferably formed integral with the box and arranged upon opposite sides thereof. The collar 10 has in its central opening 11 oppositely-disposed curved grooves 13, which are adapted to receive the curved shouldered projections 12, to permit the collar to slide over and pass the same. After the collar has been arranged upon the axle-box it is turned to carry the openings of the curved grooves 13 away from the shouldered projections, and in order to maintain the collar in this position a screw 14 is provided, which passes through the collar and engages the flange of the sleeve. An integral shouldered flange 15 is provided to enable the collar to be readily engaged and turned by a wrench when it is desired to separate or assemble the parts of the wheel. The sleeve 7 is provided in its opening or bore with oppositely-disposed grooves 16, similar to those of the collar to enable it to pass the shouldered projections of the axle-box. The collar may, if desired, be internally threaded and the axle-box externally threaded, instead of employing the shouldered projections, which are beveled toward the end of the box.

It will be readily seen that the hub is simple and inexpensive in construction and is adapted to have its parts separated and assembled to permit the removal of worn and broken spokes and the insertion of new ones or to enable any of its parts to be repaired.

What I claim is—

1. In a hub, the combination of the axle-box provided at one end with the integral flange and having at its other end the oppositely-disposed shoulders, the sleeve provided at its ends with flanges adapted to clamp the spokes, and the collar having the central opening and provided with the oppositely-disposed curved notches, substantially as described.

2. In a hub, the combination of the axle-box provided at one end with the oppositely-shouldered projections and at the other end with the integral flange 2, having radial grooves terminating in recesses, the sleeve having the oppositely-disposed grooves 16 in its opening or bore and provided at its ends with flanges having radial grooves, the collar provided with the oppositely-disposed grooves and having shoulders 15, and the screw 14, adapted to secure the collar to the sleeve, substantially as and for the purpose described.

In testimony that I claim the foregoing as my own I have hereto affixed my signature in presence of two witnesses.

JOHN S. YOUNG.

Witnesses:
J. B. WOODS,
J. E. COON.